(12) United States Patent
Toeda et al.

(10) Patent No.: US 10,939,283 B2
(45) Date of Patent: Mar. 2, 2021

(54) RADIO BASE STATION AND COMMUNICATION CONTROL METHOD

(71) Applicant: NTT DOCOMO, INC., Tokyo (JP)

(72) Inventors: Teruaki Toeda, Tokyo (JP); Tooru Uchino, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/639,031

(22) PCT Filed: Aug. 13, 2018

(86) PCT No.: PCT/JP2018/030169
§ 371 (c)(1),
(2) Date: Feb. 13, 2020

(87) PCT Pub. No.: WO2019/035434
PCT Pub. Date: Feb. 21, 2019

(65) Prior Publication Data
US 2020/0228964 A1  Jul. 16, 2020

(30) Foreign Application Priority Data
Aug. 16, 2017  (JP) .............................. JP2017-157281

(51) Int. Cl.
*H04W 16/26* (2009.01)
*H04W 88/08* (2009.01)
*H04W 8/22* (2009.01)

(52) U.S. Cl.
CPC ..................................... *H04W 8/22* (2013.01)

(58) Field of Classification Search
CPC ........ H04W 8/22; H04W 16/26; H04W 88/08
See application file for complete search history.

(56) References Cited

U.S. PATENT DOCUMENTS

| | | | |
|---|---|---|---|
| 2009/0149162 A1* | 6/2009 | Tenny | H04W 76/20 |
| | | | 455/414.1 |
| 2016/0173251 A1 | 6/2016 | Nammi et al. | |
| 2019/0253216 A1* | 8/2019 | Zhang | H04B 7/0689 |
| 2019/0380158 A1* | 12/2019 | Gao | H04W 76/12 |

OTHER PUBLICATIONS

Written Opinion issued in the counterpart International Patent Application No. PCT/JP2018/030169, dated Oct. 23, 2018 (4 pages).
(Continued)

*Primary Examiner* — Joseph E Dean, Jr.
(74) *Attorney, Agent, or Firm* — Osha Bergman Watanabe & Burton LLP

(57) ABSTRACT

A central unit (210) acquires, from a user device (300) via a radio resource control layer, UE Capability indicative of a capability of the user device (300). The central unit (210) forwards the acquired UE Capability to a distributed unit (260). The distributed unit (260) holds parameters for controlling radio communication beforehand and receives the UE Capability forwarded by the central unit (210). The distributed unit 260 determines, based on the received UE Capability, content of the parameters according to the content of the UE Capability.

7 Claims, 9 Drawing Sheets

(56) References Cited

OTHER PUBLICATIONS

International Search Report issued in the counterpart International Patent Application No. PCT/JP2018/030169, dated Oct. 23, 2018 (5 pages).
NTT Docomo, Inc.; "F1 parameter control"; 3GPP TSG RAN WG3 Meeting #97, R3-173294; Berlin, Germany; Aug. 21-25, 2017 (9 pages).
NSN; "Adding HRL to Match Procedure"; 3GPP TSG-SA WG2 Meeting #98, S2-133431; Xiamen, P.R. China; Sep. 23-27, 2013 (3 pages).
NTT Docomo, Inc.; "F1 interface: Radio resource configuration management"; TSG-RAN Working Group 3 meeting #96, R3-171823; Hangzhou, China, May 15-19, 2017 (4 pages).
Catt; "Control plane for support of NR standalone operation"; 3GPP TSG RAN WG2 Meeting #94, R2-163468; Nanjing, China, May 23-27, 2016 (5 pages).
Ericsson; "On the functional distribution over the F1 interface"; 3GPP TSG-RAN WG3 #96, Tdoc R3-171727; Hangzhou, China, May 15-19, 2017 (10 pages).

\* cited by examiner

RADIO BASE STATION AND COMMUNICATION CONTROL METHOD

TECHNICAL FIELD

The present invention relates to a radio base station including a central unit and a distributed unit and that performs radio communication with a user device, and to a communication control method.

BACKGROUND ART

3rd Generation Partnership Project (3GPP) specifies Long Term Evolution (LTE), and with the aim of further speeding, specifies LTE-Advanced (hereinbelow, the LTE includes the LTE-Advanced). Moreover, in the 3GPP, further, specification of a succeeding system of the LTE called 5G New Radio (NR) and the like is being considered.

In the NR, as an example of the configuration of a radio base station (gNB), a so-called C-RAN type radio base station that includes a central unit (Central Unit (CU)) and a distributed unit (Distributed Unit (DU)) that is installed at a remote location from the installation location of the central unit, is being considered.

Specifically, Higher Layer Split (HLS) in which only a radio resource control layer (RRC) and a packet data convergence protocol layer (PDCP) are provided in the CU, and a radio link control layer (RLC) and below are arranged in the DU, is being considered.

Moreover, assuming that the HLS is employed, it is suggested to manage parameters in the units of a user device (User Equipment, UE) in the CU and manage parameters in the units of a cell in the DU (see Non-Patent Document 1).

According to this proposal, because the CU can hold capability information (UE Capability) of the UE and information (e.g., UE classification, QoS Class Identifier (QCI), and the like) received from a core network, the CU can set the UE-specific parameters. Moreover, because mutual dependence between the CU and the DU is reduced as far as possible by avoiding management in the CU of the information of the resource relating to the DU, operation by the multivendor is expected to become easy to implement.

PRIOR ART DOCUMENT

Non-Patent Document

Non-Patent Document 1: "On the functional distribution over the F1 interface", R3-171727, 3GPP TSG-RAN WG3 #96, 3GPP, May 2017

SUMMARY OF THE INVENTION

The UE Capability is notified by the UE to the gNB via the RRC layer. Moreover, when the above HLS is followed, the RRC is arranged in the CU.

Furthermore, when the HLS is followed, it is necessary that the DU also manages the parameters that are affected by the UE Capability. However, because the DU cannot recognize the content of the UE Capability managed by the CU, disadvantageously, the DU cannot set suitable parameters according to the content of the UE Capability managed by the CU.

The present invention has been made in view of the above discussion. One object of the present invention is to provide a radio base station and a communication control method in which, even in a situation in which the capability information of the UE, which is a type of the parameters in the units of the user device (UE), is managed in the central unit (CU) and the parameters that are affected by the capability information are managed in the distributed unit (DU), the DU can determine the suitable parameters according to the content of the capability information.

A radio base station according to one aspect of the present invention is a radio base station (radio base station 200) including a first device (central unit 210) and a second device (distributed unit 260) and that performs radio communication with a user device (user device 300). The first device includes a capability information acquiring unit (capability information acquiring unit 213) that acquires, from the user device via a radio resource control layer (RRC), capability information (UE Capability) indicative of a capability of the user device; and a capability information forwarding unit (capability information forwarding unit 215) that forwards to the second device the capability information acquired by the capability information acquiring unit. The second device includes a parameter holding unit (parameter holding unit 263) that holds parameters for controlling the radio communication; a capability information receiving unit (capability information receiving unit 265) that receives the capability information forwarded by the first device; and a parameter determining unit (parameter determining unit 267) that determines the content of the parameters according to the content of the capability information based on the capability information received by the capability information receiving unit.

A communication control method according to another aspect of the present invention is a communication control method implemented in a radio base station including a first device and a second device and that performs radio communication with a user device. The communication control method includes acquiring in which the first device acquires, from the user device via a radio resource control layer, capability information indicative of a capability of the user device; forwarding in which the first device forwards the acquired capability information to the second device; holding in which the second device holds parameters for controlling the radio communication; receiving in which the second device receives the capability information forwarded by the first device; and determining in which the second device determines the content of the parameters according to the content of the capability information based on the received capability information.

BRIEF DESCRIPTION OF DRAWINGS

MODES FOR CARRYING OUT THE INVENTION (1) Overall Structural Configuration of Radio Communication System FIG. 1 is an overall structural diagram of a radio communication system 10 according to the present embodiment. The radio communication system 10 is a radio communication system in accordance with Long Term Evolution (LTE), and 5G (NR) which is a succeeding system of the LTE.

Figure 1:
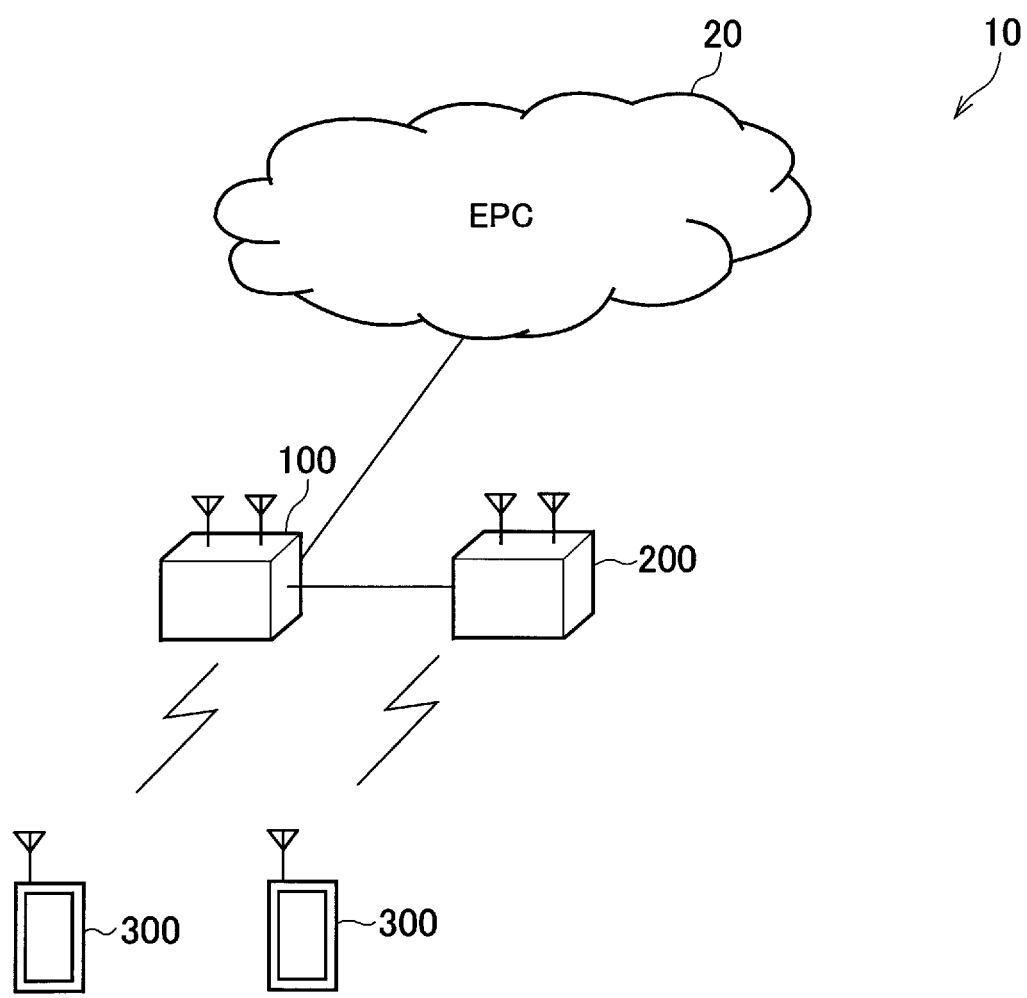
FIG. 1 is an overall structural diagram of a radio communication system 10.

In the present embodiment, the LTE (including LTE-Advanced) will be appropriately called "4G" to show the correspondence thereof with 5G. Moreover, in the present embodiment, LTE assisted operation in which 5G supplements 4G is implemented by the radio communication system 10.

The radio communication system 10 includes a core network 20, a radio base station 100, a radio base station 200, and one or more user devices 300.

The core network 20 is also called Evolved Packet Core (EPC) and is constituted by a mobility management entity (MME), a serving gateway (S-GW), PDN gateway (P-GW), and the like.

The radio base station 100 is a radio base station in accordance with the 4G and is also called eNodeB. The radio base station 100 is connected to a device (node) constituting the core network 20 via S1-MME or S1-U interface.

The radio base station 200 is a radio base station in accordance with the 5G and is also called gNodeB. The radio base station 200 is connected to the radio base station 100 via X2 interface (below conveniently referred to as X2-AP', X2-U').

The user device 300 (UE) can perform radio communication with the radio base station 100 and the radio base station 200. The user device 300 may be called a radio communication terminal or a mobile station. The radio base station 200 and the user device 300 can be caused to support, by controlling a radio signal transmitted from a plurality of antenna elements, Massive MIMO that generates a beam having higher directivity, carrier aggregation (CA) that uses a plurality of component carriers (CC), dual connectivity (DC) in which a component carrier is transmitted at the same time between a plurality of radio base stations and the user device 300, and the like.

Figure 2:
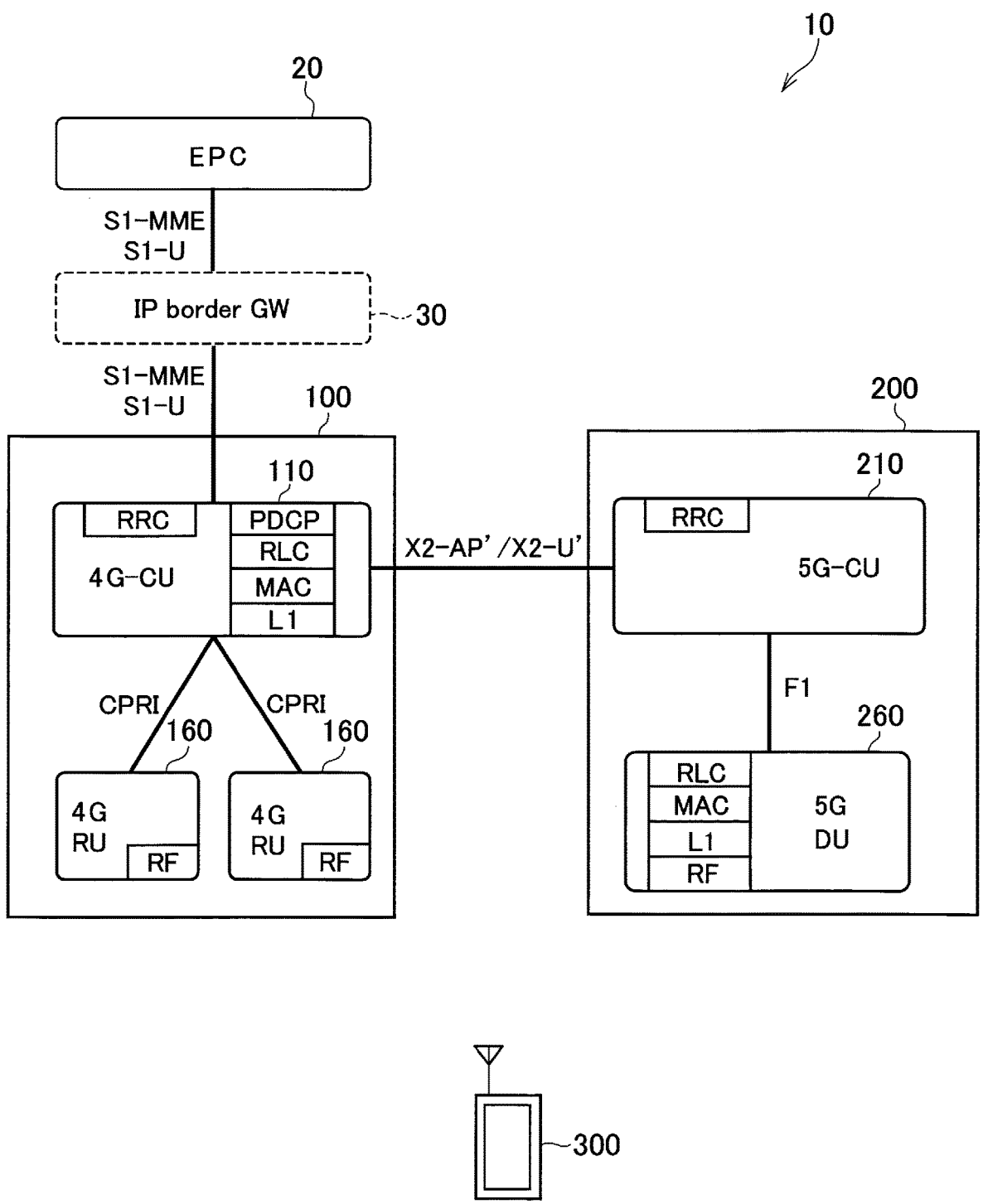
FIG. 2 is an overall block diagram of the radio communication system 10.

FIG. 2 is an overall block diagram of the radio communication system 10. As shown in FIG. 2, the radio base station 100 includes a central unit 110 and one or more remote units 160. The radio base station 200 includes a central unit 210 and a distributed unit 260. It is allowable that each of the radio base station 100 and the radio base station 200 includes one or more devices other than the central unit and the distributed unit.

In the present embodiment, the central unit 210 constitutes a first device and the distributed unit 260 constitutes a second device.

The central unit 110 includes a radio physical layer (L1), a medium access control layer (MAC), a radio link control layer (RLC), and a packet data convergence protocol layer (PDCP). Moreover, the central unit 110 includes a radio resource control layer (RRC) as an upper layer of the PDCP.

The remote unit 160 can be installed at a site that is remote from the central unit 110. The remote unit 160 includes a radio unit (RF) that can be PA (Power Amplifier)/LNA (Low Noise Amplifier), a radio transmission-reception module, a modulation-demodulation module, and the like.

The central unit 110 is called a digital processing unit (Digital Unit (DU)) or Central Unit (CU), and the remote unit 160 is called a radio processing unit (Radio Unit (RU)) or Remote Unit (RU). The central unit 110 and the remote unit 160 are connected to each other via a wired transmission path called a front-haul. For example, Common Public Radio Interface (CPRI) is used as an interface between the central unit 110 and the remote unit 160.

Although the central unit 210 and the distributed unit 260 respectively correspond to the central unit 110 and the remote unit 160, the layer configuration thereof are different.

Specifically, the central unit 210 includes a radio resource control layer (RRC). On the other hand, the distributed unit 260 includes a radio link control layer (RLC), a medium access control layer (MAC), a radio physical layer (L1), and a radio unit (RF).

A layer separation between such central unit 210 and distributed unit 260 is called Higher Layer Split (HLS). Moreover, the central unit 210 is called Central Unit (CU) and the distributed unit 260 is called Distributed Unit (DU).

As described above, the central unit 210 is connected to the central unit 110 via X2-AP', X2-U' interface.

More specifically, in the HLS, it is assumed that the central unit 210 (CU) performs the processing of RRC/Service Data Adaptation Protocol (SDAP)/PDCP layer, and the distributed unit 260 (DU) performs the processing of the layer RLC or below.

In the below explanation, the central unit 210 and the distributed unit 260 will be suitably abbreviated to the CU and the DU, respectively.

(2) Functional Block Configuration of Radio Communication System

A functional block configuration of the radio communication system 10 is explained below. Specifically, a functional block configuration of the central unit 210 and the distributed unit 260 is explained below.

(2.1) Central Unit 210

Figure 3:
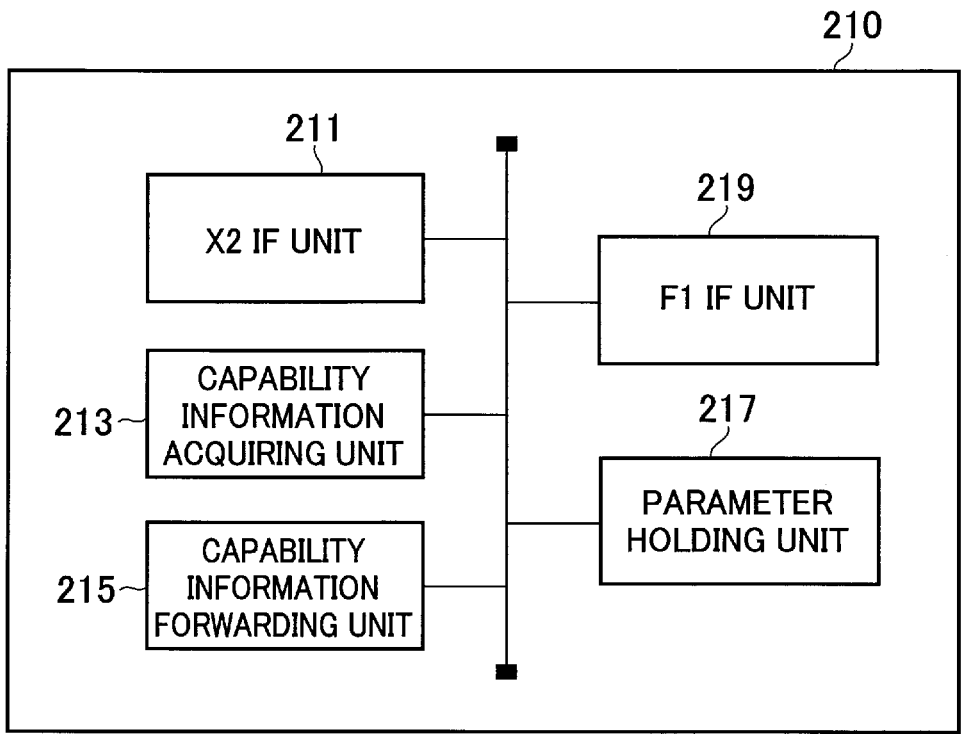
FIG. 3 is a functional block diagram of a central unit 210.

FIG. 3 is a functional block diagram of the central unit 210. As shown in FIG. 3, the central unit 210 includes X2 IF unit 211, a capability information acquiring unit 213, a capability information forwarding unit 215, a parameter holding unit 217, and F1 IF unit 219.

The X2 IF unit 211 provides an interface for realizing a communication with the central unit 110. Specifically, the X2 IF unit 211 is an interface (X2) for directly connecting the central unit 110 and the central unit 210 to each other.

Data transmitted from and received by the user device 300 is relayed to the radio base station 100 via the X2 IF unit 211.

The capability information acquiring unit 213 acquires capability information (UE Capability) indicative of the capability of the user device 300. Specifically, the capability information acquiring unit 213 acquires information indicative of the capability of the user device 300 relating to release of Access Stratum (AS) supported by the user device 300, capability (e.g., maximum bit number transmittable and receivable per TTI (Transmission Time Interval) and layer 2 buffer size) per UE Capability, a frequency band (including the band combination), carrier aggregation (CA), and the like.

For example, the UE Capability may be equivalent to UE-EUTRA-Capability prescribed in 3GPP TS36.331 Chapter 6.3.6. Moreover, the UE Capability may include the capability information peculiar to 5G. Moreover, the UE Capability can include the capability information provided by the core network 20 and that can be managed by the central unit 210, e.g., information (QoS Class Identifier (QCI) and the like) relating to UE classification (UE type) and the QoS.

The capability information acquiring unit 213 acquires the capability information from the user device 300 via the radio resource control layer (RRC). Specifically, the capability information acquiring unit 213 can acquire the capability information included in RRC message (e.g., UE Capability information) transmitted by the user device 300.

The capability information forwarding unit 215 forwards to the distributed unit 260 the capability information (UE Capability) acquired by the capability information acquiring unit 213. Specifically, the capability information forwarding unit 215 forwards the UE Capability to the distributed unit 260 via the F1 IF unit 219.

Moreover, the capability information forwarding unit 215 can forward to the distributed unit 260 only the capability information relating to determination of the parameters performed by a later-explained parameter determining unit 267 of the distributed unit 260. Specifically, the capability information forwarding unit 215 forwards to the distributed unit 260 only the capability information of the user device 300 that is necessary for the determination of the parameters and held by a later-explained parameter holding unit 263 of the distributed unit 260.

For example, as such capability information, a modulation method (256QAM, 64QAM, and the like) supported by the user device 300 can be listed. Specifically, ue-CategoryDL/UL (TS36.306 Chapter 4.1A) of the UE-EUTRA-Capability prescribed by 3GPP TS36.331 Chapter 6.3.6 can be listed.

If the capability information has been encoded (RRC encoding) in the RRC, the capability information forwarding unit 215 can decode the encoded capability information. In this case, the capability information forwarding unit 215 forwards the decoded capability information to the distributed unit 260.

The parameter holding unit 217 can maintain a plurality of parameters for controlling the radio communication with the user device 300. Specifically, the parameter holding unit 217 follows the Higher Layer Split (HLS) and basically holds the parameters in the units of the UE. However, as mentioned earlier, the UE Capability is appropriately forwarded to the distributed unit 260.

The F1 IF unit 219 provides an interface for realizing a communication between the central unit 210 and the distributed unit 260. Specifically, the F1 IF unit 219 is an interface (hereinafter, "F1") that directly connects the central unit 210 to the distributed unit 260. The transmitted and received data of the user device 300 is relayed to the distributed unit 260 via the F1 IF unit 219.

(2.2) Distributed Unit 260

Figure 4:
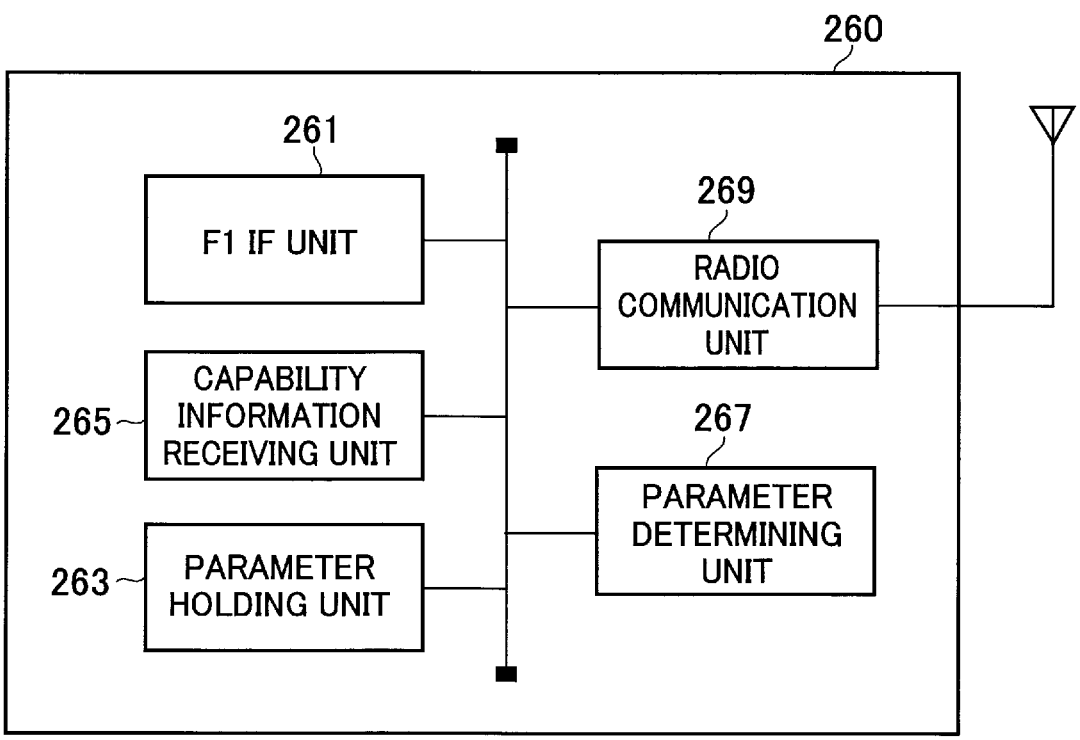
FIG. 4 is a functional block diagram of a distributed unit 260.

FIG. 4 is a functional block diagram of the distributed unit 260. As shown in FIG. 4, the distributed unit 260 includes F1 IF unit 261, the parameter holding unit 263, the capability information receiving unit 265, the parameter determining unit 267, and a radio communication unit 269.

The F1 IF unit 261, in the same manner as the F1 IF unit 219, provides an interface for realizing a communication between the central unit 210 and the distributed unit 260.

The parameter holding unit 263, in the same manner as the parameter holding unit 217, can hold a plurality of parameters for controlling the radio communication with the user device 300. Specifically, the parameter holding unit 263 follows the Higher Layer Split (HLS) and basically holds the parameters in the units of the cell. However, as mentioned earlier, the UE Capability is appropriately forwarded from the central unit 210.

The capability information receiving unit 265 receives the capability information (UE Capability) forwarded by the central unit 210. Specifically, the capability information receiving unit 265 receives the UE Capability via the F1 IF unit 261.

The capability information receiving unit 265 includes a memory for temporarily holding the UE Capability forwarded by the central unit 210. The capability information receiving unit 265 provides the UE Capability held in the memory to the parameter determining unit 267.

Moreover, the capability information receiving unit 265 can receive the capability information that is encoded in the radio resource control layer (RRC encoding). The capability information receiving unit 265 decodes the received UE Capability.

Furthermore, the capability information receiving unit 265 can receive the capability information encoded in the RRC, not from the central unit 210, but from the user device 300. The capability information receiving unit 265 decodes the capability information received from the user device 300.

The parameter determining unit 267 determines, among the parameters for controlling the radio communication with the user device 300, the content of the parameters held by the distributed unit 260. Specifically, the parameter determining unit 267 determines the content (set values) of the parameters held by the parameter holding unit 263.

Particularly, in the present embodiment, the parameter determining unit 267 determines, based on the UE Capability received by the capability information receiving unit 265, the content of the parameters according to the content of the UE Capability.

For example, as such parameters, the maximum MCS (Modulation and Coding Scheme) determined based on the modulation method (256QAM, 64QAM, and the like) supported by the user device 300 can be listed.

Moreover, the parameter determining unit 267, upon determining that the UE Capability forwarded by the central unit 210 has overflown, can truncate at least a part of the UE Capability.

Specifically, when the memory in which the UE Capability forwarded by the central unit 210 is temporarily held by the capability information receiving unit 265 overflows with data of the UE Capability, the parameter determining unit 267 can use a part of the UE Capability held earlier by the memory and discard the data of the UE Capability overflowing from the memory.

Moreover, the parameter determining unit 267 can notify the central unit 210, upon discarding the data of the UE Capability, of the fact that the data has been discarded, or an amount of the discarded data, or a location of the discarded data. Alternatively, the central unit 210 can grasp a memory use state (or memory free space) of the distributed unit 260, and the central unit 210 can truncate a part of the information and can forward that information to the distributed unit 260.

The radio communication unit 269 performs the radio communication with the user device 300. Specifically, the radio communication unit 269 performs the radio communication with the user device 300 according to the specification of the 5G. As mentioned earlier, the radio communication unit 269 can support the Massive MIMO, the carrier aggregation (CA), the dual connectivity (DC), and the like.

(3) Operation of Radio Communication System

An operation of the radio communication system 10 is explained below. Specifically, an operation performed by the radio base station 200 for managing the capability information (UE Capability) of the user device 300 is explained next.

(3.1) Outline of Operation

Figure 5:
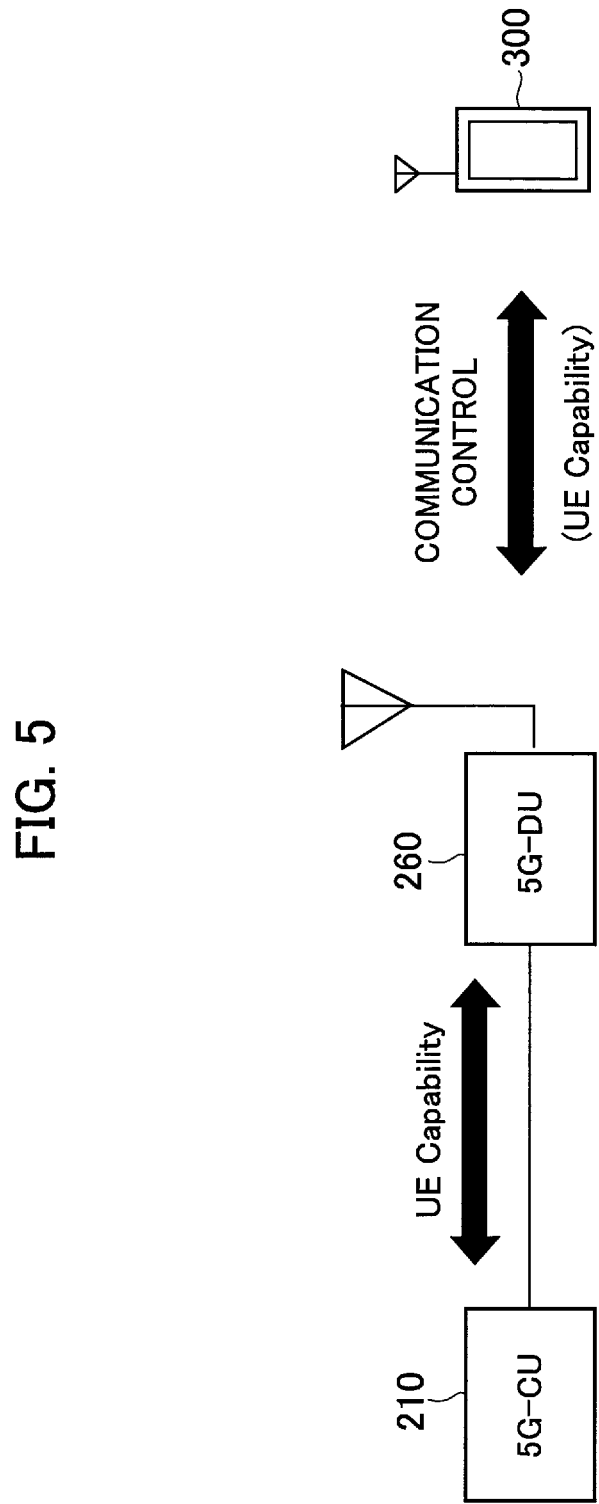
FIG. 5 is a conceptual diagram of a management operation of capability information (UE Capability) of a user device 300 performed by the central unit 210 and the distributed unit 260.

The FIG. 5 is a conceptual diagram of a management operation of the capability information (UE Capability) of the user device 300 performed by the central unit 210 and the distributed unit 260.

As shown in FIG. 5, the UE Capability of the user device 300 is transmitted and received between the central unit 210 (CU) and the distributed unit 260 (DU).

The distributed unit 260 determines the content of the parameters for controlling the radio communication with the user device 300 based on the UE Capability received from the central unit 210 (or the UE Capability received directly from the user device 300).

In this manner, in the present embodiment, the parameters (parameters in the units of the cell) that are determined in the DU are determined considering the setting content in the UE Capability. Moreover, in the present embodiment, an interface necessary for such transmission and reception of the UE Capability between the CU and the DU is provided.

(3.2) Operation Example 1

Figure 6:
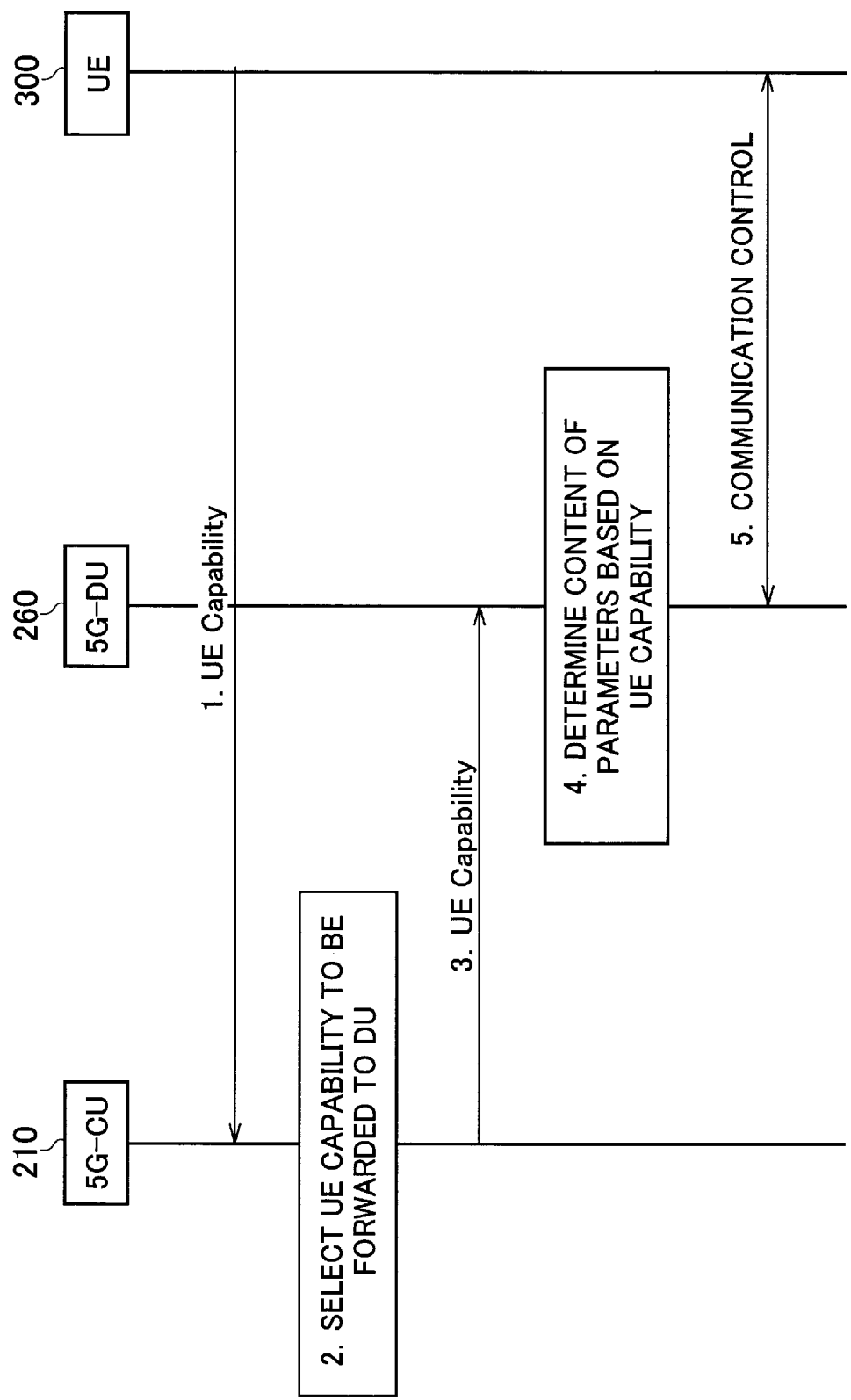
FIG. 6 is a view showing an operation example (Operation Example 1) for determining, based on the UE Capability of the user device 300, by the distributed unit 260 the parameters for controlling radio communication with the user device 300.

FIG. 6 is a view showing an operation example (Operation Example 1) for determining, based on the UE Capability of the user device 300, by the distributed unit 260 the parameters for controlling the radio communication with the user device 300. In this operation example, the central unit 210 (CU) forwards the acquired UE Capability to the distributed unit 260 (DU). That is, both the CU and the DU manage (hold) the UE Capability.

As shown in FIG. 6, the central unit 210 acquires the UE Capability transmitted by the user device 300 (Step 1). Specifically, the central unit 210 acquires the UE Capability included in the message (e.g., UE Capability information) of the RRC.

Note that, as mentioned earlier, the UE Capability can be of the UE-EUTRA-Capability (see 3GPP TS36.331 Chapter 6.3.6) assumption. Moreover, the central unit 210 can acquire the capability information (UE type, QCI and the like) of the user device 300, not from the user device 300, but from the core network 20, for example, via the radio base station 100.

The central unit 210 selects the UE Capability to be forwarded to the distributed unit 260 (Step 2). Specifically, the central unit 210 selects, among the capability items that constitute the acquired UE Capability, those items that should be forwarded to the distributed unit 260.

Note that, whether to forward an item is determined based on a criteria whether that item affects the determination by the distributed unit 260 of the radio communication control parameters with the user device 300. That is, the central unit 210 can notify the distributed unit 260 of the capability information relating to the function that the distributed unit 260 supports.

The central unit 210 can select, based on the above criteria, all the items of the acquired UE Capability as the target for forwarding. Alternatively, the central unit 210 can select some items of the UE Capability as the target of forwarding.

The central unit 210 forwards the selected UE Capability to the distributed unit 260 (Step 3).

The distributed unit 260 determines the content of the radio communication control parameters with the user device 300 based on the forwarded UE Capability (Step 4). Specifically, the distributed unit 260 determines the content of the radio communication control parameters according to the content of the forwarded UE Capability. Note that, the radio communication control parameters may be merely called radio parameters.

The distributed unit 260 performs the communication control of the user device 300 based on the determined content of the radio communication control parameters (Step 5).

Moreover, as mentioned above, when the UE Capability forwarded by the central unit 210 overflows, the distributed unit 260 can truncate at least a part of the UE Capability.

(3.3) Operation Example 2

Figure 7:
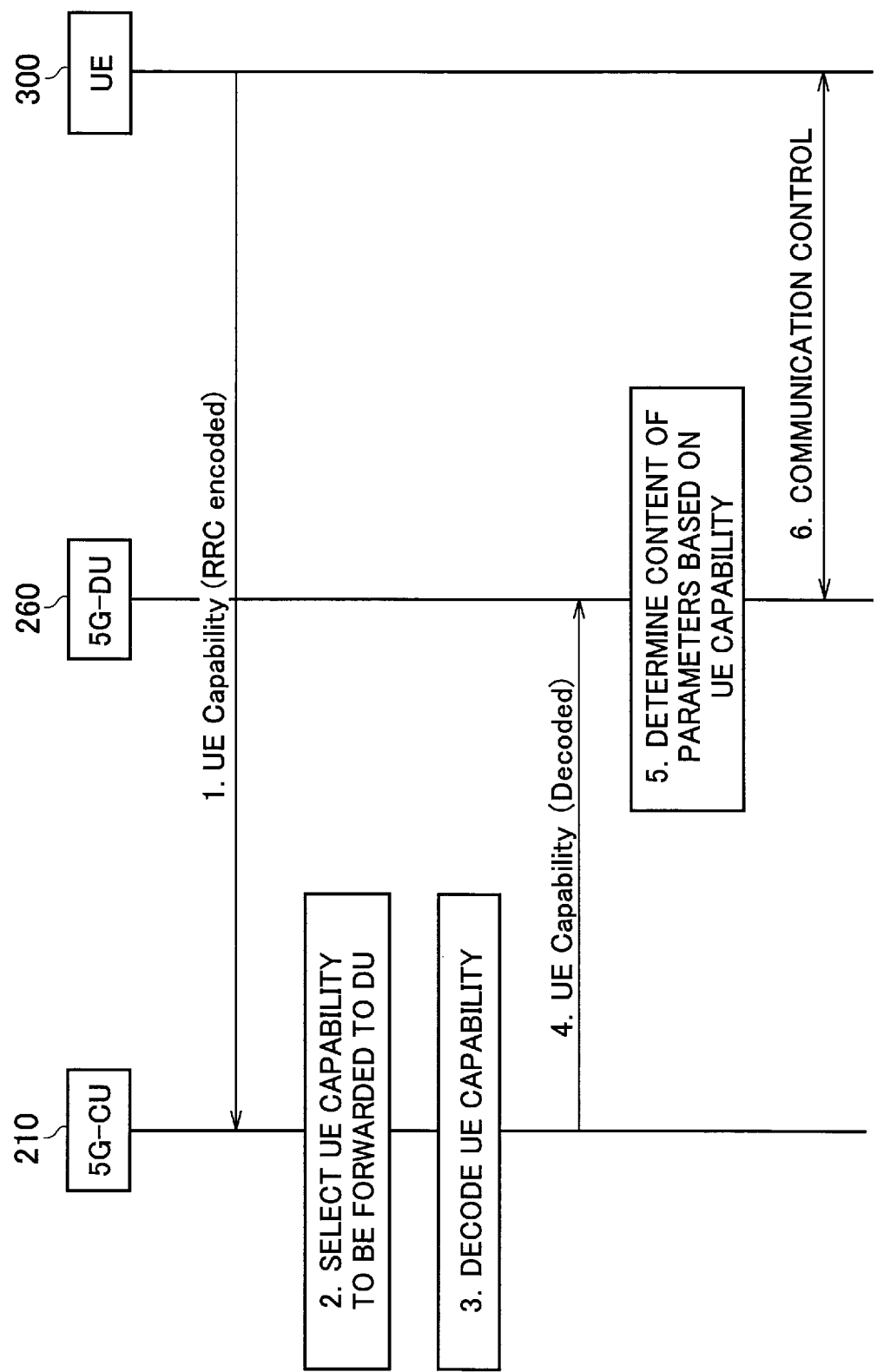
FIG. 7 is a view showing an operation example (Operation Example 2) for determining, based on the UE Capability of the user device 300, by the distributed unit 260 the parameters for controlling the radio communication with the user device 300.

FIG. 7 is a view showing an operation example (Operation Example 2) for determining, based on the UE Capability of the user device 300, by the distributed unit 260 the parameters for controlling the radio communication with the user device 300. In this operation example, the central unit 210 (CU) decodes the acquired UE Capability and forwards the decoded UE Capability to the distributed unit 260 (DU). The different portions with respect to Operation Example 1 will be mainly explained below, and an explanation of the similar portions will be appropriately omitted.

As shown in FIG. 7, the central unit 210 acquires the UE Capability in the same manner as in Operation Example 1; however, the UE Capability has been encoded (RRC encoding) ("RRC encoded" at Step 1 in FIG. 7). That is, in Operation Example 1, the capability items that constitute the UE Capability can be simply directly forwarded to the DU as information elements (IE); however, when it is necessary to forward to the DU the RRC encoding performed UE Capability included in the message of the user device 300, as in the present operation example, the central unit 210 decodes the RRC encoding performed UE Capability.

Step 2 is similar to that in Operation Example 1. Then, the central unit 210 decodes the RRC encoding performed UE Capability (Step 3).

The central unit 210 forwards the selected UE Capability to the distributed unit 260 (Step 4). The forwarded UE Capability is in the decoded state ("Decoded" in FIG. 7). Steps 5 and 6 of the present operation example are similar to Steps 4 and 5 of Operation Example 1.

In the present operation example, the distributed unit 260 does not have to decode the UE Capability forwarded from the central unit 210, and, because only that UE Capability that is necessary in the distributed unit 260 is forwarded, the capability and performance necessary for the distributed unit 260 can be reduced.

Moreover, the central unit 210 not only decodes the UE Capability but can extract, among the capability items that need to be forwarded, only the items that are actually necessary for determining the radio communication control parameters by the distributed unit 260. Furthermore, the central unit 210 can convert the extracted items to a format (Index types and the like) that is different from the format of the UE Capability and can forward the format converted UE Capability to the distributed unit 260.

(3.4) Operation Example 3

Figure 8:
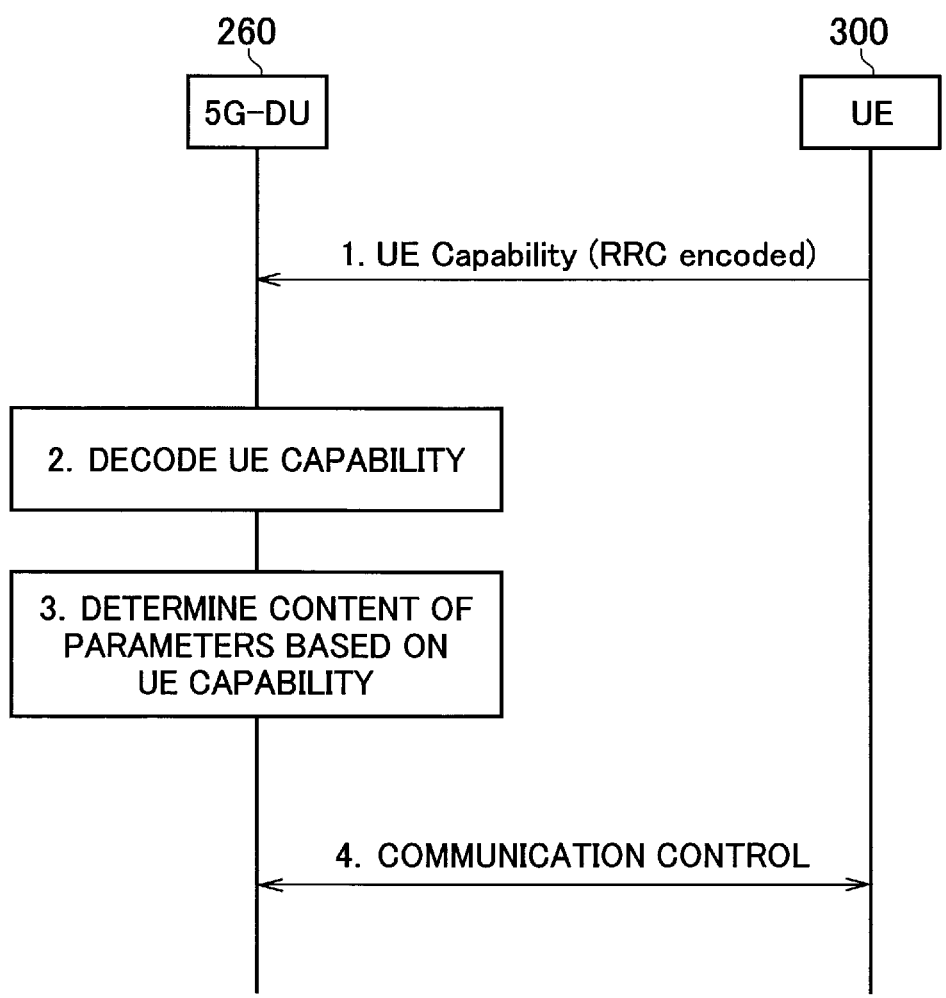
FIG. 8 is a view showing an operation example (Operation Example 3) for determining, based on the UE Capability of the user device 300, by the distributed unit 260 the parameters for controlling the radio communication with the user device 300.

FIG. 8 is a view showing an operation example (Operation Example 3) for determining, based on the UE Capability of the user device 300, by the distributed unit 260 the parameters for controlling the radio communication with the user device 300. In this operation example, the distributed unit 260 (DU) acquires the UE Capability directly from the user device 300, and the distributed unit 260 (DU) decodes the acquired UE Capability. The different portions with respect to Operation Examples 1 and 2 will be mainly explained here.

As shown in FIG. 8, the distributed unit 260 acquires the encoded (RRC encoding) UE Capability from the user device 300 (Step 1).

The distributed unit 260 decodes the acquired UE Capability and recognizes the content of the UE Capability (Step 2).

The distributed unit 260 determines the content of the radio communication control parameters with the user device 300 based on the decoded UE Capability (Step 3). Step 4 is similar to Step 5 of Operation Example 1.

In the present operation example, when providing the UE Capability to the distributed unit 260, because it is not necessary to send the UE Capability via the central unit 210, the capability and performance necessary for the central unit 210 can be reduced.

(3.5) Operation Example 4

Figure 9:
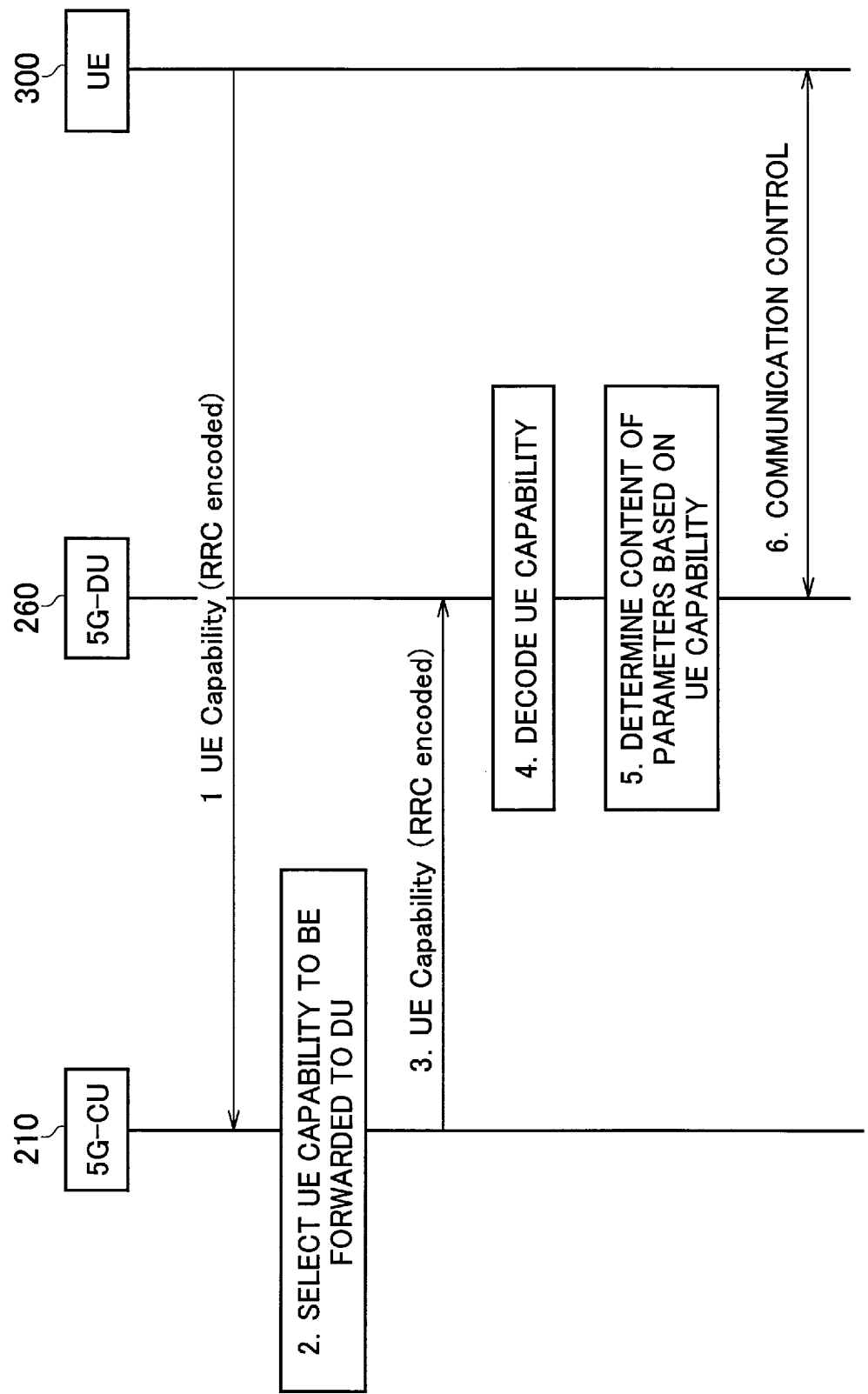
FIG. 9 is a view showing an operation example (Operation Example 4) for determining, based on the UE Capability of the user device 300, by the distributed unit 260 the parameters for controlling the radio communication with the user device 300.

FIG. 9 is a view showing an operation example (Operation Example 4) for determining, based on the UE Capability of the user device 300, by the distributed unit 260 the parameters for controlling the radio communication with the user device 300. In the present operation example, the central unit 210 (CU) forwards the encoded UE Capability to the distributed unit 260 (DU). The different portions with respect to Operation Examples 1 and 2 will be mainly explained here.

Steps 1 and 2 shown in FIG. 9 are similar to Steps 1 and 2 of Operation Example 2. The central unit 210 forwards the selected UE Capability to the distributed unit 260 (Step 3). The forwarded UE Capability is not decoded but encoded (RRC encoding) ("RRC encoded" in FIG. 9).

The distributed unit 260 decodes the acquired UE Capability and recognizes the content of the UE Capability (Step 4).

The distributed unit 260 determines the content of the radio communication control parameters with the user device 300 based on the decoded UE Capability (Step 5). Step 6 is similar to Step 6 of Operation Example 2.

In the present operation example, in the same manner as Operation Example 1, because only that UE Capability that is necessary in the distributed unit 260 is forwarded, the capability and performance necessary for the distributed unit 260 can be reduced. On the other hand, because it is not necessary for the central unit 210 to decode the UE Capability and forward the decoded UE Capability to the distributed unit 260, the capability and performance necessary for the central unit 210 can be reduced.

(4) Effects and Advantages

With the present embodiment, the following effects and advantages can be obtained. Specifically, the central unit 210 forwards to the distributed unit 260 the UE Capability acquired from the user device 300. Moreover, the distributed unit 260 determines, based on the received UE Capability, the content of the radio communication control parameters according to the content of the UE Capability.

Therefore, even in a situation in which the capability information (UE Capability) of the UE, which is a type of the parameters in the units of the user device (UE), is managed in the central unit 210 (CU) and the parameters that are affected by the capability information are managed in the distributed unit 260 (DU), the distributed unit 260 can determine the suitable parameters according to the content of the capability information.

In the present embodiment, the central unit 210 (capability information forwarding unit 215) can forward to the distributed unit 260 only the UE Capability relating to the determination of the radio communication control parameter in the distributed unit 260. Therefore, the capability and performance necessary for the distributed unit 260 can be reduced. Moreover, the amount of data transmitted and received between the CU and the DU can be reduced.

In the present embodiment, when the UE Capability forwarded by the central unit 210 overflows, the distributed unit 260 can truncate at least a part of the UE Capability. Therefore, while reducing the capability and performance necessary for the distributed unit 260, the distributed unit 260 can determine the radio communication control parameter based on the UE Capability.

In the present embodiment, the central unit 210 (capability information forwarding unit 215) decodes the UE Capability encoded in the RRC and forwards the decoded UE Capability to the distributed unit 260. Therefore, the distributed unit 260 does not have to decode the UE Capability forwarded from the central unit 210, and, because only that UE Capability that is necessary in the distributed unit 260 is forwarded, the capability and performance necessary for the distributed unit 260 can be reduced.

Moreover, in the present embodiment, the distributed unit 260 (capability information receiving unit 265) receives the UE Capability encoded in the RRC and can decode the received UE Capability. Therefore, because only that UE Capability that is necessary in the distributed unit 260 is forwarded, the capability and performance necessary for the distributed unit 260 can be reduced. On the other hand, because it is not necessary for the central unit 210 to decode the UE Capability and forward the decoded UE Capability to the distributed unit 260, the capability and performance necessary for the central unit 210 can be reduced.

Furthermore, in the present embodiment, the distributed unit 260 (capability information receiving unit 265) can receive the capability information encoded in the RRC, not from the central unit 210, but from the user device 300. Therefore, when providing the UE Capability to the distributed unit 260, because it is not necessary to send the UE Capability via the central unit 210, the capability and performance necessary for the central unit 210 can be reduced.

(5) Other Embodiments

The present invention has been explained in detail by using the above mentioned embodiments; however, it is self-evident to a person skilled in the art that the present invention is not limited to the embodiments explained herein and that the embodiments can be modified or improved in various ways.

For example, in the above embodiments, Higher Layer Split (HLS) was premised, but in the present invention the HLS is not necessarily the premise. Specifically, the present invention can be applied not only to a split in inter-PDCP-RLC, like in the HLS, but also a split in inter-RLC-MAC, in intra-RLC, and in intra-MAC.

Moreover, in the above embodiment, a situation in which the RRC layer is arranged in the central unit 210 (CU), and the central unit 210 acquires the UE Capability and forwards the acquired UE Capability to the distributed unit 260 (DU) is explained; however, the configuration is not limited to this.

Specifically, the DU can detect the UE Capability of the user device 300 by using frequency resource, time resource, or random access preamble (RA preamble) of PRACH (Physical Random Access Channel), LCID (Logical channel ID) of Msg 3, and the like. Note that, in this configuration, because the CU does not recognize the UE Capability acquired by the DU, the DU forwards (notifies) the detected UE Capability to the CU.

Specifically, when the DU determines the parameters relating to the UE Capability, it is not necessary that the CU is notified of the UE Capability. However, when the user device 300 is connected to a plurality of DUs (e.g., dual connectivity), the UE Capability is notified via the CU to the other DUs to which the user device 300 is connected and the UE Capability is shared.

On the other hand, when the CU determines the parameters relating to the UE Capability, it is necessary to notify the CU of the UE Capability.

In the above embodiment, an example of management in which the parameters in the units of the UE are managed in the central unit 210 (CU) and the parameters in the units of the cell are managed in the distributed unit 260 (DU) is explained; however, such management is not necessary.

Moreover, the block diagrams used for explaining the embodiments (FIGS. 3 and 4) show functional blocks. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 10:
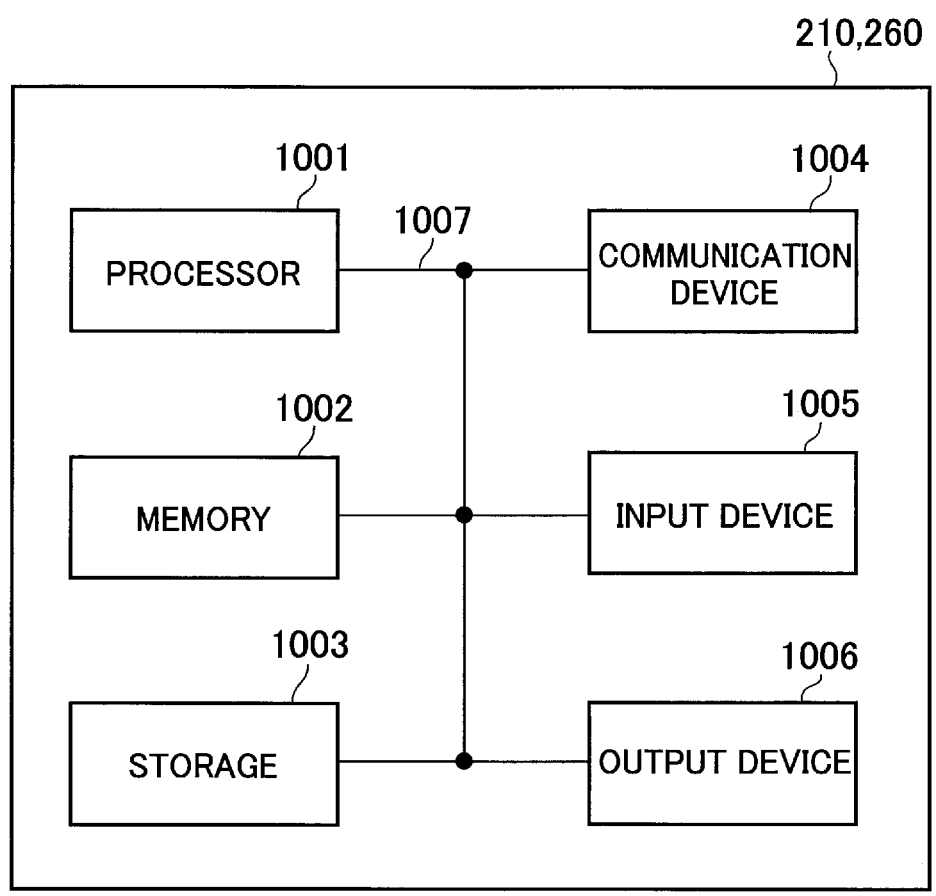
FIG. 10 is a view showing an example of hardware configuration of the central unit 210 and the distributed unit 260.

Furthermore, the central unit 210, and the distributed unit 260 (devices) explained above can function as a computer that performs the processing of the present invention. FIG. 10 is a diagram showing an example of a hardware configuration of the devices. As shown in FIG. 10, each of the devices can be configured as a computer device including a processor 1001, a memory 1002, a storage 1003, a communication device 1004, an input device 1005, an output device 1006, and a bus 1007.

The functional blocks of the devices (see FIGS. 3 and 4) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes), software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)), other signals, or a combination thereof. In addition, the RRC signaling can be called an RRC message, and the RRC signaling can be, for example, an RRC Connection Setup message, an RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the radio base station 200 can be performed by another network node (device). Moreover, functions of the radio base station 200 can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The radio base station 100 and the radio base station 200 can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably in the present specification. The base station can also be referred to as a fixed station, NodeB, eNodeB (eNB), gNodeB (gNB), an access point, a femtocell, a small cell, and the like.

The user device 300 is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as a, an, and the in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be apparent to a person skilled in the art.

INDUSTRIAL APPLICABILITY

With the above radio base station and the communication control method, even in a situation in which the capability information of the UE, which is a type of the parameters in the units of the user device (UE), is managed in the central unit (CU) and the parameters that are affected by the capability information are managed in the distributed unit (DU), the DU can determine suitable parameters according to the content of the capability information.

EXPLANATION OF REFERENCE NUMERALS

10 Radio communication system
20 Core network
100 Radio base station
110 Central unit
160 Remote unit
200 Radio base station
210 Central unit
211 X2 IF unit
213 Capability information acquiring unit
215 Capability information forwarding unit
217 Parameter holding unit
219 F1 IF unit
260 Distributed unit
261 F1 IF unit
263 Parameter holding unit
265 Capability information receiving unit
267 Parameter determining unit
269 Radio communication unit
300 User device
1001 Processor
1002 Memory
1003 Storage
1004 Communication device
1005 Input device
1006 Output device
1007 Bus

The invention claimed is:

1. A radio base station including a first device and a second device and that performs radio communication with a user device, wherein
the first device includes
a capability information acquiring unit that acquires, from the user device via a radio resource control layer, capability information indicative of a capability of the user device; and a capability information forwarding unit that forwards to the second device the capability information acquired by the capability information acquiring unit, and the second device includes a capability information receiving unit that receives the capability information forwarded by the first device; and a parameter determining unit that determines a content of parameters that controls the radio communication and according to the content of the capability information based on the capability information received by the capability information receiving unit.

2. The radio base station as claimed in claim 1, wherein the capability information forwarding unit forwards to the second device only the capability information relating to determination of the parameters in the parameter determining unit.

3. The radio base station as claimed in claim 1, wherein the parameter determining unit truncates, upon determining that the capability information forwarded by the first device overflows, at least a part of the capability information.

4. The radio base station as claimed in claim 1, wherein the capability information forwarding unit decodes the capability information that is encoded in the radio resource control layer and forwards the decoded capability information to the second device.

5. The radio base station as claimed in claim 1, wherein the capability information receiving unit receives the capability information that is encoded in the radio resource control layer and decodes the received capability information.

6. The radio base station as claimed in claim 1, wherein the capability information receiving unit receives from the user device the capability information that is encoded in the radio resource control layer and decodes the received capability information.

7. A communication control method implemented in a radio base station including a first device and a second device and that performs radio communication with a user device, the communication control method comprising:

acquiring in which the first device acquires, from the user device via a radio resource control layer, capability information indicative of a capability of the user device;

forwarding in which the first device forwards the acquired capability information to the second device;

receiving in which the second device receives the capability information forwarded by the first device; and determining in which the second device determines a content of parameters that controls the radio communication and according to the content of the capability information based on the received capability information.

\* \* \* \* \*